United States Patent
Yuyama

(10) Patent No.: US 8,849,928 B2
(45) Date of Patent: Sep. 30, 2014

(54) INFORMATION COMMUNICATION TERMINAL, METHOD OF MARKING MAIL AS READ, AND PROGRAM FOR MARKING MAIL AS READ

(75) Inventor: Takashi Yuyama, Daito (JP)

(73) Assignee: Kyocera Corporation, Kyoto (JP)

( * ) Notice: Subject to any disclaimer, the term of this patent is extended or adjusted under 35 U.S.C. 154(b) by 555 days.

(21) Appl. No.: 13/030,072

(22) Filed: Feb. 17, 2011

(65) Prior Publication Data
US 2011/0145353 A1 Jun. 16, 2011

Related U.S. Application Data

(63) Continuation of application No. 11/939,042, filed on Nov. 13, 2007, now Pat. No. 7,912,912.

(30) Foreign Application Priority Data

Nov. 13, 2006 (JP) .................................. 2006-307089

(51) Int. Cl.
G06F 15/16 (2006.01)
G06Q 10/10 (2012.01)

(52) U.S. Cl.
CPC .................................... *G06Q 10/107* (2013.01)
USPC ......................................................... 709/206

(58) Field of Classification Search
USPC ......................................................... 709/206
See application file for complete search history.

(56) References Cited

U.S. PATENT DOCUMENTS

| | | | |
|---|---|---|---|
| 5,212,477 A * | 5/1993 | Indekeu et al. ............... | 340/7.55 |
| 5,835,084 A * | 11/1998 | Bailey et al. .................. | 715/783 |
| 5,935,247 A * | 8/1999 | Pai et al. ......................... | 726/29 |
| 6,067,070 A * | 5/2000 | Suzuki et al. ................. | 345/660 |
| 6,452,597 B1 | 9/2002 | Goldberg et al. | |
| 7,092,998 B2 * | 8/2006 | Frietas et al. ................. | 709/217 |
| 7,177,665 B2 | 2/2007 | Ishigaki | |
| 2004/0008154 A1 | 1/2004 | Miyata et al. | |
| 2005/0188320 A1* | 8/2005 | Bocking ........................ | 715/752 |
| 2007/0203991 A1* | 8/2007 | Fisher et al. .................. | 709/206 |

FOREIGN PATENT DOCUMENTS

| | | |
|---|---|---|
| JP | 8-335151 | 12/1996 |
| JP | 10-42215 | 2/1998 |
| JP | 10-93618 | 4/1998 |

(Continued)

OTHER PUBLICATIONS

Notification of Reasons for Refusal for Japanese Patent Application No. 2010-115225, mailed Jul. 12, 2011, 9 pages (including English translation).

(Continued)

*Primary Examiner* — Rupal Dharia
*Assistant Examiner* — Robert B McAdams
(74) *Attorney, Agent, or Firm* — Duane Morris LLP

(57) ABSTRACT

The present invention is an information communication terminal having a function of displaying, together with a received mail list, part or all of a message of a received mail in the selected state in the preview. The information communication terminal includes: a judgment unit judging whether all of the message of the received mail in the selected state fits in a predetermined area for the preview display; and an update unit performing an update in the case when the judgment is affirmative so that information indicating whether the received mail has already been read indicates that it has already been read.

7 Claims, 8 Drawing Sheets

| MAIL NUMBER | SENDER | MAIL MESSAGE | UNREAD/READ INFORMATION |
|---|---|---|---|
| 001 | TSUKANISHI | I'VE GOT BOOK YOU ASKED FOR. | UNREAD |
| 002 | KEIGO YASUOKA | MEET UP AT 10. ↵ DON'T BE LATE! | UNREAD |
| 003 | HARUKO TERAMURA | G'MORNING :-) ↵ HOW ARE YOU? ↵ CATCH YOU UP LATER. | UNREAD |
| 004 | k1saiga@AAA.ne.jp | LONG TIME NO SEE. THIS IS SAIGA. HOW HAVE YOU BEEN... | READ |
| 005 | SATO ELECTRONICS STORE | YOUR ORDERED mp3 PLAYER HAS COME IN. ... | READ |
| : | : | : | : |

(56) References Cited

FOREIGN PATENT DOCUMENTS

| | | |
|---|---|---|
| JP | 10-207887 | 8/1998 |
| JP | 2000-115527 | 4/2000 |
| JP | 2001-245025 | 9/2001 |
| JP | 2001-318914 | 11/2001 |
| JP | 2002-156957 | 5/2002 |
| JP | 2002-366489 | 12/2002 |
| JP | 2003-204399 | 7/2003 |
| JP | 2005-149372 | 6/2005 |
| JP | 2006-155369 | 6/2006 |
| JP | 2006-235722 | 6/2006 |
| JP | 2006-268527 | 10/2006 |
| KR | 10-2004-0004093 | 1/2004 |

OTHER PUBLICATIONS

Japanese Office Action dated Oct. 7, 2008, issued in corresponding Japanese Patent Application No. 2006-307089.

Japanese Office Action dated Jan. 20, 2009, issued in corresponding Japanese Patent Application No. 2006-307089.

Maruyama, Palm Magazine vol. 12, Jul. 22, 2002, pp. 44-49.

Shimizu et al., "Crisis-Management Technique of Business Mail" Secure Mail Software, Let's Use Shuriken Pro3; published by JustSystems Corporation; first copy published Jun. 20, 2003.

"Netscape Messenger: Master Electronic Software"; PCWORK! Mainichi Communications Inc., vol. 4, No. 11, Nov. 18, 1997, pp. 135-137.

Izumoi, "PC Introductory Class Fundamental of Electronic Mail"; Nikkei Personal Computing, published Jul. 9, 2001.

Ishii, "Information Communication Terminal, Method for Marking E-Mail as Read, and Program for Marking E-Mail as Read"; published by PC Online, Jun. 27, 2006.

Takizawa, "Information Communication Terminal, Method for Marking E-Mail as Read, and Program for Marking E-Mail as Read", published by PC Online, Jun. 27, 2006.

Japanese Office Action from JP Patent Application No. 2008-311777, mailed on Mar. 30, 2010.

Japanese Office Action from JP Patent Application No. 2008-311778, mailed on Mar. 30, 2010.

Japanese Office Action from JP Patent Application No. 2008-311779, mailed on Mar. 30, 2010.

* cited by examiner

FIG. 2

| MAIL NUMBER | SENDER | MAIL MESSAGE | UNREAD/READ INFORMATION |
|---|---|---|---|
| 001 | TSUKANISHI | I'VE GOT BOOK YOU ASKED FOR. | UNREAD |
| 002 | KEIGO YASUOKA | MEET UP AT 10. ↵ DON'T BE LATE! | UNREAD |
| 003 | HARUKO TERAMURA | G'MORNING :-) ↵ HOW ARE YOU? ↵ CATCH YOU UP LATER. | UNREAD |
| 004 | k1saiga@AAA.ne.jp | LONG TIME NO SEE. THIS IS SAIGA. HOW HAVE YOU BEEN... | READ |
| 005 | SATO ELECTRONICS STORE | YOUR ORDERED mp3 PLAYER HAS COME IN. ... | READ |
| ... | ... | ..... | ..... |

FIG. 4

| MAIL NUMBER | SENDER | MAIL MESSAGE | UNREAD/READ INFORMATION |
|---|---|---|---|
| 001 | TSUKANISHI | I'VE GOT BOOK YOU ASKED FOR. | READ |
| 002 | KEIGO YASUOKA | MEET UP AT 10. ↵<br>DON'T BE LATE! | READ |
| 003 | HARUKO TERAMURA | G'MORNING :-) ↵<br>HOW ARE YOU? ↵<br>CATCH YOU UP LATER. | UNREAD |
| 004 | k1saiga@AAA.ne.jp | LONG TIME NO SEE. THIS IS SAIGA. HOW HAVE YOU BEEN... | READ |
| 005 | SATO ELECTRONICS STORE | YOUR ORDERED mp3 PLAYER HAS COME IN. ... | READ |
| ... | ... | ... | ... |

| FONT | CHARACTER SIZE | CHARACTER OCCUPANCY RATE IN PREVIEW DISPLAY FIELD | |
|---|---|---|---|
| MS GOTHIC | 12 | FULL SIZE : 1 | HALF SIZE : 0.5 |
| MS GOTHIC | 8 | FULL SIZE : 0.7 | HALF SIZE : 0.35 |
| MS MINCHO | 12 | FULL SIZE : 1 | HALF SIZE : 0.5 |
| MS MINCHO | 8 | FULL SIZE : 0.7 | HALF SIZE : 0.35 |
| Century | 12 | UPPER CASE : 0.7 | LOWER CASE : 0.4 |
| ... | ... | ... | ... |

INFORMATION COMMUNICATION TERMINAL, METHOD OF MARKING MAIL AS READ, AND PROGRAM FOR MARKING MAIL AS READ

CROSS-REFERENCE TO RELATED APPLICATIONS

This application is a continuation of U.S. patent application Ser. No. 11/939,042 filed Nov. 13, 2007, which claims priority to Japanese Patent Application No. 2006-307089 filed Nov. 13, 2006, the disclosures of which are herein incorporated by reference in their entirety.

BACKGROUND OF THE INVENTION (1) Field of the Invention

The present invention relates to an information communication terminal, in particular to a process of displaying received mail.

(2) Description of the Related Art

To check a received mail item on a mobile telephone, the user opens the received mail folder, which causes a list of senders of the received mail to be displayed. Then, the user operates the cursor using direction keys to select one of the received mail items and pushes down a confirm button for mail display, and whereby the message of the mail is displayed. From this point onward, the mail item is treated as read mail, assumed that its message has been read by the user. When there is an unread mail item, being not treated as read mail, an icon indicating that there is an unread mail item is displayed on the mobile telephone.

Some recent mobile phones have a function to display, when the user is operating the cursor on the display of the received mail list using the direction keys, a preview of the message of a mail item selected by the cursor. When a mail item in the list is selected by the cursor, the characters of the selected mail item may be highlighted in reverse video of the black and white, or the cursor may simply be changed to an arrow pointing to the selected mail item. In a preview display, the beginning portion, e.g. only the first two lines, of the message of the mail item selected by the cursor is displayed together with the received mail list in order to call the user's attention to the content of the selected mail item. Thus, with the preview display, the user is able to readily check or understand the content of the mail item. Since the preview of the selected mail item is displayed with the received mail list, the preview display area is fairly limited, and it is accordingly sometimes the case that the user cannot check the entire message of the mail item in the preview. In this case, therefore, it is desirable that the mail item be treated as unread.

On the other hand, because it is hard to write, and also read, a long mail message on a mobile device like a mobile telephone, short messages are often exchanged, and therefore the limited display area may be sufficient for displaying such a short message. In this case, it is cumbersome for the user to perform an operation to make the short-message mail item as read. For example, assume the case in which the user, who had checked the message of a mail item in the preview, changed the display straight back to a standby screen without actually performing an operation to display the message. Here, although the user has checked the mail message in the preview, the mail item is not treated as read mail, and an icon appears indicating that the mail item has not been read. Because of the icon, the user may misunderstand that another mail item has been received, and accordingly check again the same, already checked mail item. In order to prevent such occurrence, the user has to perform an operation of displaying the mail message; however, the operation is cumbersome for the user since he/she has already checked the mail message in the preview.

SUMMARY OF THE INVENTION

The present invention is an information communication terminal that displays, together with a received mail list, at least part of a message of a received mail in a predetermined display area. The information communication terminal comprises: a receiving unit operable to receive a mail; a storage unit operable to store therein the received mail in association with unread/read information indicating whether the received mail has already been read; a judgment unit operable to make a judgment on whether all of the message of the received mail is displayed in the predetermined display area; and an update unit operable to perform an update in a case when the judgment is affirmative so that the unread/read information indicates that the received mail has already been read.

The present invention may also be a method of marking mail as read used on a mobile telephone that displays in a predetermined display area, together with a received mail list, at least part of a message of a received mail chosen from the received mail list by cursor operation and set in a selected state. The method comprising the steps of: receiving a mail; making a judgment on whether all of the message of the received mail is displayed in the predetermined display area; and updating, in a case when the judgment is affirmative, unread/read information indicating whether the received mail has already been read so as to indicate that the received mail has already been read.

Further, the present invention may also be a program for marking mail as read used on a mobile telephone that displays in a predetermined display area, together with a received mail list, at least part of a message of a received mail chosen from the received mail list by cursor operation and set in a selected state. The program causing a computer of the mobile telephone to execute the steps of: receiving a mail; making a judgment on whether all of the message of the received mail is displayed in the predetermined display area; and updating, in a case when the judgment is affirmative, unread/read information indicating whether the received mail has already been read so as to indicate that the received mail has already been read.

Here, all required to the received mail list is to be a list of information that allows the user to distinguish each of received mails. For example, it may be a list of titles of received mails. Note that the received mail list includes at least one received mail.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example of data of received mail stored in the mobile telephone;

FIG. 4 shows changes in the data of the received mail shown in FIG. 2, in the case where a preview is displayed;

FIG. 7 shows examples of fonts used in the preview and data for each font stored in the mobile telephone.

DESCRIPTION OF THE PREFERRED EMBODIMENT

The following describes a preferred embodiment of an information communication terminal of the present invention, a mobile telephone, with the aid of drawings.

Embodiment

Structure

Figure 1:
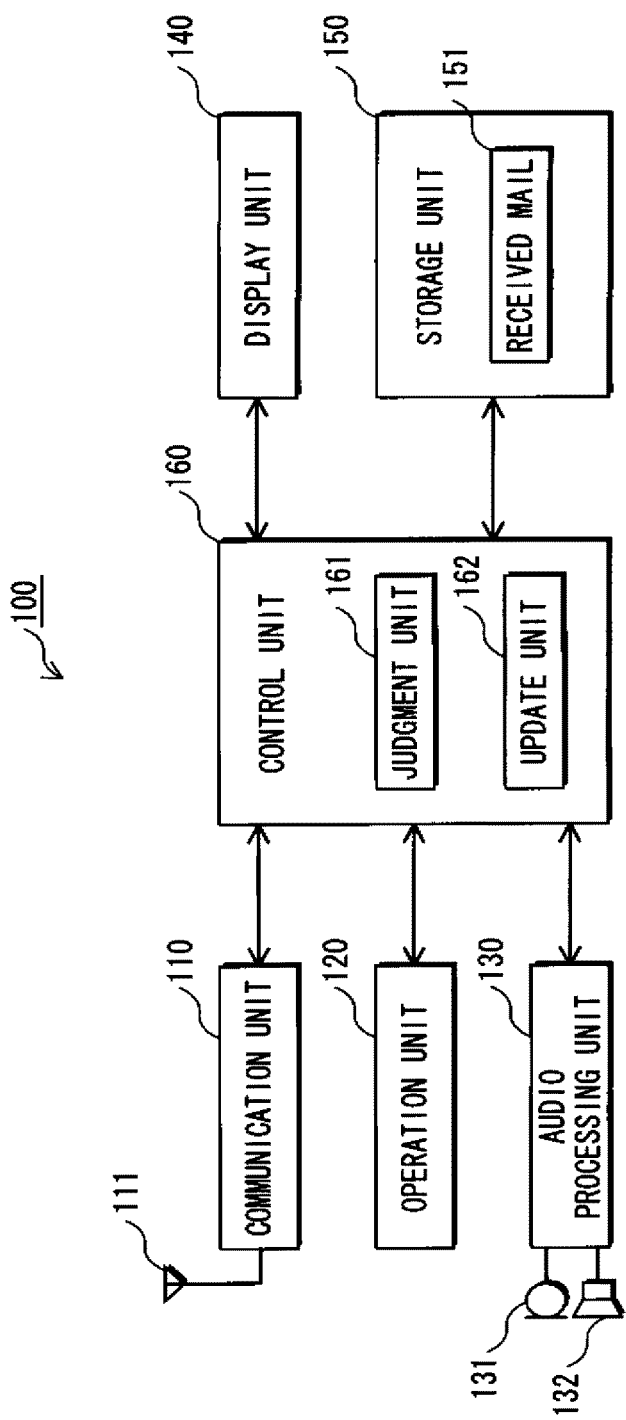
FIG. 1 is a functional block diagram showing functional components of a mobile telephone.

FIG. 1 is a functional block diagram showing functional components of a mobile telephone 100. As shown in FIG. 1, the mobile telephone 100 includes a communication unit 110, an operation unit 120, an audio processing unit 130, a display unit 140, a storage unit 150, and a control unit 160.

The above-mentioned receiving unit, storage unit, judgment unit and update unit are realized by the communication unit 110, the storage unit 150, a judgment unit 161 of the control unit 160, and an update unit 162 of the control unit 160, respectively.

The communication unit 110 is formed including therein an antenna 111. The communication unit 110 demodulates a received signal received from the antenna 111 into a received sound signal and a received data signal, and outputs the demodulated received sound signal and received data signal to the audio processing unit 130 and the control unit 160, respectively. Further, the communication unit 110 has a function of modulating a transmitted sound signal which has been A/D converted at the audio processing unit 130 and a transmitted data signal, such as an e-mail given from the control unit 160, and outputting the modulated signals from the antenna 111.

The operation unit 120 includes a group of various keys, such as a numeric keypad, an on-hook key, an off-hook key, direction keys, an enter key, and a mail key. The operation unit 120 has a function of receiving a user's operation and transmitting the received operation to the control unit 160. In the present invention, an instruction related to data transmission is received from the user.

The audio processing unit 130 has a function of D/A converting the received sound signal output from the communication unit 110 and outputting the converted signal to the speaker 132 and a function of A/D converting the transmitted sound signal obtained from a microphone 131 and outputting the thus generated signal to the communication unit 110.

The display unit 140 includes a monitor realized by an LCD (Liquid Crystal Display) or the like, and has a function of displaying, on the monitor, images indicated by the control unit 160. Specifically speaking, the display unit 140 displays thereon a standby screen, mail messages, a time and the like. In the present invention, a preview of a selected received mail item is displayed together with a list of received mail.

The storage unit 150 is formed including ROM (Read Only Memory) and RAM (Random Access Memory), and is realized by a small-sized hard disk, a nonvolatile memory and the like. The storage unit 150 has a function of storing therein various data and programs. In the present invention, the storage unit 150 stores therein received mail 151. The received mail 151 is a collection of mail items received by the mobile telephone 100, and the details are described later in the specification.

The control unit 160 has a function of controlling each component of the mobile telephone 100. In the present invention, the control unit 160 is formed including the judgment unit 161 and update unit 162.

The judgment unit 161 detects the number of characters of a received mail message, and judges whether it is within 34, which is the number of characters that can be displayed in the preview field. When the judgment unit 161 determines that it is 34 or less and the mail item is displayed in the preview, the judgment unit 161 transmits to the update unit 162, full-text display information indicating that the entire message of the mail item has been displayed in the preview field. The full-text display information includes therein a number for identifying the mail item and an indication of the entire text of the mail message has been displayed in the preview. In addition, when the number of characters included in a received mail item is 35 and the 35th character is a period, full-text display information is exceptionally transmitted to the update unit 162.

The update unit 162 has a function of updating, when unread/read information indicates "UNREAD", the unread/read information so as to indicate "READ" in response to the full-text display information transmitted from the judgment unit 161. The unread/read information is a flag indicating each received mail item stored in the storage unit is either unread or read mail. Further, when the user operates on the operation unit 120 to select one mail item to display the message of the mail item and then the mail message is displayed on the display unit 140, if the unread/read information of the displayed mail item indicates "UNREAD", the update unit 162 updates the unread/read information to indicate "READ". Herewith, the unread/read information can be shared when the message of a received mail item is displayed in a normal manner and when it is displayed in the preview.

[Data]

In FIG. 2, received mail 151a is shown as an example of displaying a list of the received mail 151 stored in the storage unit 150. As shown in the figure, in the storage unit 150, a field of mail number 201, a field of sender 202 of the received mail item, a field of mail message 203 and a field of unread/read information 204 are stored in association with each other. According to the example, only these sets of information are displayed; however, the mail address and received time and date may also be associated therewith.

In the field of mail number 201, information of a number assigned, for identification purposes, by the mobile telephone 100 to each mail item is written.

In the field of sender 202, information indicating a person or a company having sent the mail item is written.

In the field of mail message 203, information of the message of the mail item is written.

In the field of unread/read information 204, information indicating whether the mail has been read by the user is written. Here, for easier comprehension, the term "READ" or "UNREAD" is used. In practice, the information "1" indicating "READ" and the information "0" indicating "UNREAD" are stored on the computer of the mobile telephone.

For example, the sender of the mail number "001" is "Tsukanishi", and the mail message is "I've got book you asked for.", which includes 28 characters (one space is counted as one character) with no linefeed code. The unread/read information of the mail item in FIG. 2 indicates the mail item is yet to be read.

Further, the sender of the mail number "002" is "Keigo Yasuoka", and the mail message is "Meet up at 10. Don't be late!". In FIG. 2, the unread/read information indicates the mail item is yet to be read. The mail message is made up of two lines with a linefeed code following the 14th character, and the 1st and 2nd lines include 14 characters each.

Further, the sender of the mail number "003" is "Haruko Teramura", and the mail message is "G'morning:-) How are you? Catch you up later.". In FIG. 2, the unread/read information indicates the mail item is yet to be read. The mail message includes an emoticon (face mark), and is made up of three lines with a linefeed code following the 12th character in each of the 1st and 2nd lines. The 1st and 2nd lines include 12 characters each and the 3rd line includes 19 characters, with a total of 43 characters.

In terms of the mail numbers "004" and "005", the unread/read information indicates "READ".

Figure 3B:
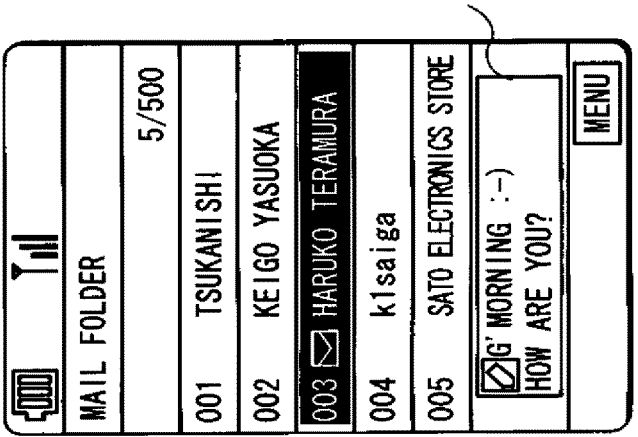
FIG. 3B shows another example of a preview on the mobile telephone.
Figure 3A:
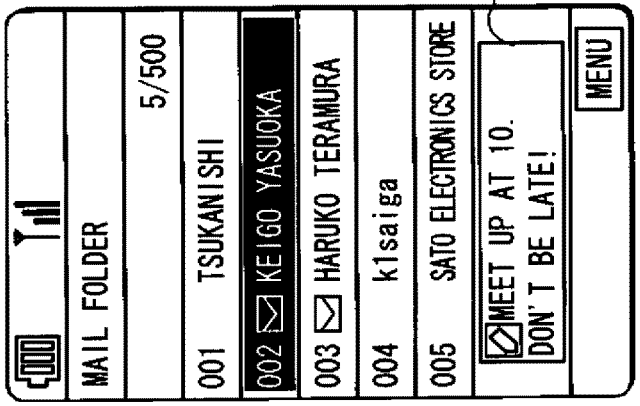
FIG. 3A shows an example of a preview on the mobile telephone.

FIG. 3 shows examples of a display screen with preview. FIG. 3A is an example of the display screen in which the message of the mail number 002 is displayed in a preview field together with a list that is created based on the mail list of FIG. 2. FIG. 3B is an example of the display screen in which the message of the mail number 003 is displayed in the preview field after the user has made an operation on the mobile telephone in the state of FIG. 3A.

As is seen in FIG. 3A that the mail number 002 is selected, the line of the mail number 002 is highlighted in reverse video, and the message is displayed in a preview field 301a. In the case of the mail number 002, the entire message fits in the preview field 301a.

On the other hand, as is seen in FIG. 3B that the mail number 003 is selected, the line of the mail number 003 is highlighted in reverse video. Only the first two lines of the message appear in a preview field 301b, and the entire message of the mail number 003 is not shown.

As can be seen from the change from FIG. 3A to FIG. 3B, the entire message of the mail number "002", which is unread in FIG. 3A, is displayed in the preview field, and therefore the state of the mail changes from "UNREAD" to "READ". Accordingly, in FIG. 3B, an icon indicating that the mail item has yet to be read is no longer displayed. When the received mail list is being displayed, the process of updating the icon is performed after the cursor is moved.

Here describes the preview field. The preview field is able to display only two lines of mail message, and up to 16 characters and 18 characters can be fitted in the 1st and 2nd lines, respectively.

FIG. 4 shows received mail 151b having been changed from the received mail 151a of FIG. 2 after the preview, as shown in FIGS. 3A and 3B, was displayed.

When the messages of the mail numbers "001", "002" and "003" are displayed in the preview field as shown in FIGS. 3A and 3B, regarding the mail numbers "001" and "002", the entire message fits in the preview field; however, the entire message of the mail number "003" does not fit therein.

Accordingly, the judgment unit 161 transmits, to the update unit 162, the full-text display information for the mail numbers "001" and "002" only. The update unit 162 updates the flags of the mail numbers "001" and "002" from "UNREAD" to "READ", and accordingly the received mail 151a is updated to the received mail 151b.

Figure 5A:
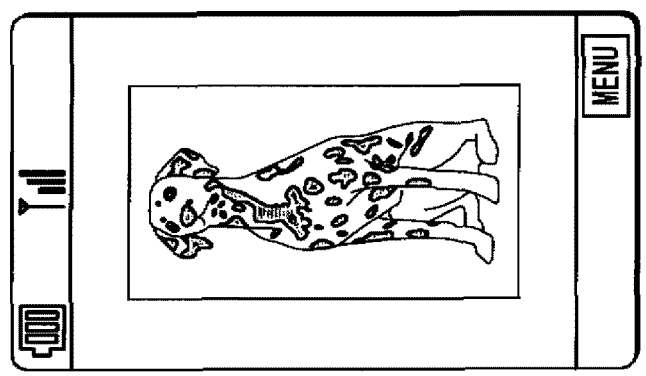
FIG. 5A shows a display example of a standby screen when there is no unread mail item.
Figure 5B:
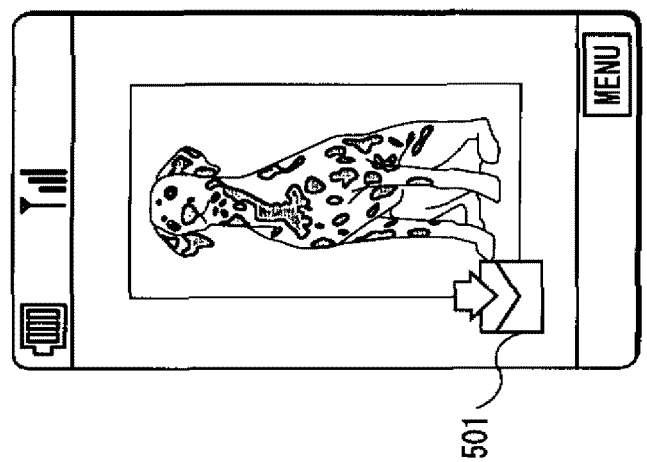
FIG. 5B shows a display example of the standby screen when there is an unread mail item.

FIG. 5 shows an example regarding displays based on the unread/read information. FIG. 5A shows an example of a standby screen for the case where all received mail items have already been read; and FIG. 5B shows an example of the standby screen for the case where there is a received mail item yet to be read.

FIG. 5B shows an example of the standby screen in the case where there is a received mail item yet to be read, and an unread mail icon 501 is displayed as shown in FIG. 5B. The icon is displayed when unread mail information is included in the mail list stored in the storage unit 150.

On the other hand, when there is no unread mail information and all received mail items have already been read, the unread mail icon 501 of FIG. 5B is not displayed, as shown in FIG. 5A.

[Operation]

Figure 6:
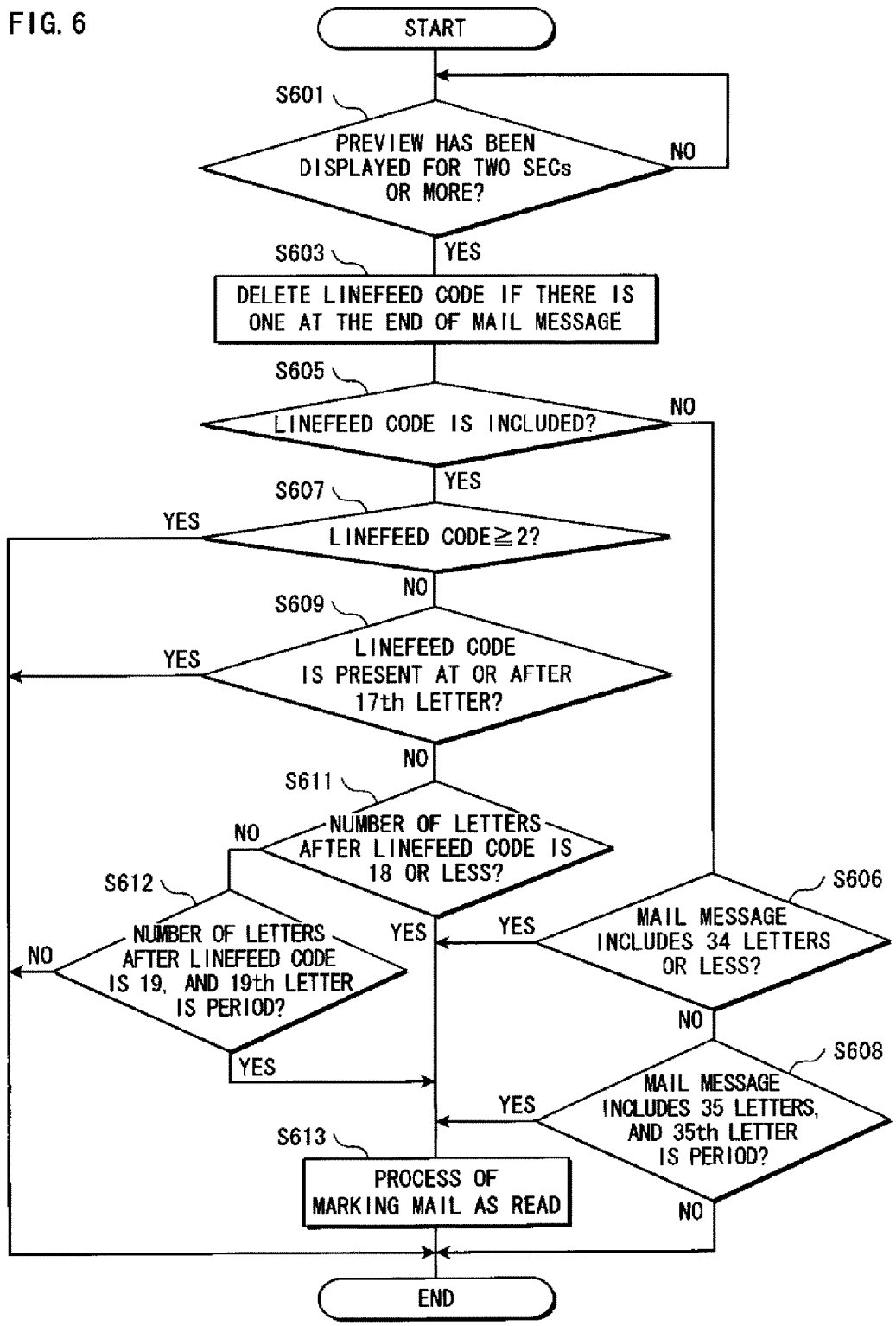
FIG. 6 is a flowchart showing a process of making a mail item as read mail when the mail item is displayed in the preview on the mobile telephone.

The following describes, according to the present embodiment, operation of the mobile telephone 100 for changing the state of a mail item to be regarded as having already been read, with the aid of a flowchart of FIG. 6. The operation is described here, starting with the state in which a mail list with a preview, like one shown in FIG. 3, is displayed on the mobile telephone 100.

First, the control unit 160 of the mobile telephone 100 judges whether two seconds have elapsed since the message of a selected mail item, which is highlighted in reverse video, is displayed in the preview field (Step S601). The time is measured from the point after the mobile telephone 100 performs an output of the preview, and the judgment is made based on whether the user performs operation on the cursor during the period. When the message of the selected mail item has yet to be displayed in the preview for two seconds or more (Step S601: NO), the control unit 160 waits that two seconds elapse. Or when another mail item is selected, the control unit 160 starts timing from the beginning. The reason of judging whether two seconds have elapsed is to prevent the incidence in which the selected mail item becomes regarded as having already been read when the user simply moves the cursor quickly and the mail item happens to be selected in that way. The two seconds is provided to assure that the mail message is checked by the user.

When two seconds has elapsed after the message of the selected mail is displayed in the preview (Step S601: YES), and there is a linefeed code at the end of the mail message, the control unit 160 deletes the linefeed code (Step S603). Note however that the deletion is not performed practically, but this step is performed only to judge whether the entire mail message has been displayed in the preview. This step is provided assuming the case that some mail items include two or more linefeed codes at the end. These extra linefeed codes do not have to be displayed in the preview since such information is meaningless to the user. Accordingly, the step is adopted, also in this case, to change the state of the mail item to be regarded as having already been read.

With the linefeed codes at the end of the mail message being deleted, the judgment unit 161 judges whether there is a linefeed code within the mail message (Step S605). Regarding the judgment of the presence of a linefeed code, to put it briefly, the storage unit 150 prestores therein a code for identifying a linefeed code, and the judgment is made based on whether the mail message includes a code that matches the prestored code.

When a linefeed code is included in the mail message (Step S605: YES), the judgment unit 161 judges whether there are two or more linefeed codes (Step S607).

When two or more linefeed codes are not included, i.e. there is only one (Step S607: NO), the judgment unit 161 judges whether the linefeed code is positioned at or after the 17th character of the message (Step S609). When the linefeed code is not positioned at or after the 17th character (Step S609: NO), the judgment unit 161 judges whether the number of characters following the linefeed code is 18 or less (Step S611).

When the number of characters following the linefeed code is 18 or less (Step S611: YES), the judgment unit 161 notifies the update unit 162 that the entire message of the selected mail item has been displayed in the preview. In response to the notice, the update unit 162 updates the unread/read information of the mail item, if it indicates "UNREAD", to "READ" in the received mail 151 of the storage unit 150 (Step S613).

When there is one linefeed code which is not positioned at or after the 17th character and the number of characters following the linefeed code is 18 or less (Step S611: NO), the judgment unit 161 judges whether the number of characters following the linefeed code is 19 and the 19th letter is a period (Step S612). When the 19th character is a period (Step S612: YES), the judgment unit 161 notifies the update unit 162 that the entire message of the selected mail item has been displayed in the preview. In response to the notice, the update unit 162 updates the unread/read information of the mail item, if it indicates "UNREAD", to "READ" in the received mail 151 of the storage unit 150 (Step S613). When the 19th character is a period, the user needs not to see it even though it is not displayed. Therefore, in such a case, the mail item is treated as having already been read, whereby eliminating the necessity for the user to perform an operation to display the message of the received mail item.

Then, when an instruction indicating to end the mail list display is received from the user, the process is ended. In the case where a direction key is pressed and a different mail item is selected, the process shown in the flowchart is started from the beginning for the mail item.

When there are two or more linefeed codes (Step S607: YES), when there is one linefeed code which is positioned at or after the 17th character of the mail message (Step S609: YES), or when there is one linefeed code, the number of characters following the linefeed code is 19, and the 19th letter is not a period (Step S612: NO), the process of changing the state of the mail item to "READ" is not performed, and the operation is ended with the unread/read information of the mail item remaining to be "UNREAD".

In Step S605, when there is no linefeed code in the mail message (Step S605: NO), the judgment unit 161 judges whether the number of characters of the mail message is 34 or less (Step S606).

When the number of characters of the mail message exceeds 34 (Step S606: NO), the judgment unit 161 judges whether the number of characters of the mail message is 35 and then the 35th character is a period (Step S608).

When the number of characters of the mail message is 34 or less (Step S606: YES), or when the number of characters of the mail message is 35 and the 35th character is a period (Step S608: YES), the judgment unit 161 notifies the update unit 162 that the entire message of the selected mail item has been displayed in the preview. In response to the notice, the update unit 162 updates the unread/read information of the mail item, if it indicates "UNREAD", to "READ" in the received mail 151 of the storage unit 150 (Step S613).

Then, when an instruction indicating to end the mail list display is received from the user, the process is ended. In the case where a direction key is pressed and a different mail item is selected, the process shown in the flowchart is started from the beginning for the selected mail item.

When the number of characters of the mail message exceeds 34 (Step S606: NO) and then the number of characters of the mail message is not 35 and the 35th character is not a period (Step S608: NO), the process of changing the state of the mail item to "READ" is not performed, and the operation is ended with the unread/read information of the mail remaining to be "UNREAD".

Thus concludes the description of the process of changing the state of mail item to "READ" according to the present invention when the mail item has been checked in the preview on the mobile telephone 100.

According to the above structure, the mobile telephone 100 is able to cause a received mail item whose entire message has been displayed on the preview screen to be treated as read mail. Herewith, a mail item whose message content has once been checked in a predetermined area, i.e. the preview field, is made to be treated as read mail, eliminating the necessity for the user to perform a cumbersome operation to change the mail item to the "READ" state.

In addition, with the procedure of Step S601 of FIG. 6 above, only when a predetermined period of time (two seconds in Step S601) has elapsed since a received mail item being displayed in the preview, a judgment is made whether the entire message of the received mail item has been displayed in the preview, and accordingly the unread/read information is updated to be "READ". Therefore, it is possible to prevent the unread/read information of the mail item from being changed to "READ" in the case when the mail item is displayed in the preview only for a moment as a result of a cursor being quickly moved, and thus the user has yet to check the mail message.

[Additional Particulars]

The mobile telephone of the present invention has been described based on the above embodiment; however, it is a matter of course the present invention is not limited to the embodiment. The following describes modifications of the present invention.

(1) The present invention may be a method of marking mail as read that is used on the mobile telephone described in the above embodiment, or a computer program which is loaded to a computer of the mobile telephone and executed to thereby achieve the method.

The computer program may be stored in a recording medium, such as a memory, an FD (flexible disk), an MO (Magneto Optical disc), a CD (Compact Disc), a DVD (Digital Versatile Disc), or a BD (Blu-ray Disc).

(2) The above embodiment makes a judgment on whether the entire mail message has been displayed in the preview field, indifferent to the font and size of the characters. However, the font of the characters displayed in the preview field may be changed according to the user's preference.

The mobile telephone of the present invention may be adapted to support multiple fonts and judge whether the mail message fits in the preview field in accordance with each font. Herewith, it is possible to make a judgment whether the mail message fits in the preview field in accordance with each font.

In this case, the mobile telephone needs to prestore in the storage unit 150, various types of character fonts and also a list indicating how much space a character in individual fonts, like ones shown in FIG. 7, occupies in the preview field.

As shown in FIG. 7, a font table 700 includes a font field 701, a character size field 702, and a character occupancy rate field in the preview field 703.

In the font field 701, the font name identifying each type of font is written.

The character size field 702 indicates the size of the character when displayed in the font. The examples shown here are the character sizes of 12 and 8. Although not shown in the figure, the character size can be other than 12 or 8.

The character occupancy rate field in the preview field 703 indicates with a numerical value, an area occupied by one character in the font in the horizontal direction within the preview field. The occupancy rate is indicated by a converted value when one full-size character in MS Gothic with a character size of 12 is 1. It can be seen from the figure that "MS Gothic" and "MS Mincho" have different character occupancy rates when displayed in full size and in half size, and also "Century" has different character occupancy rates when displayed in upper case and in lower case. Furthermore, some fonts have a different occupancy size for each type of character, and in such a case, it is necessary to store a value representing the occupancy rate for each type of character. Note that "MS Gothic" and "MS Mincho" are Japanese fonts. And a full-size character has a larger width when displayed than a half-size character. It is here described with simplicity that one half-size character is a one-byte character. In practice, however, some fonts include two-byte half-size characters. Here, if having the same size as a one-byte half-size character, a two-byte half-size character is treated as a half-size character.

Then, when the control unit 160 judges whether the entire mail message fits in the preview field, the judgment may be made, based on values representing occupancy rates of individual characters of a font in use, to see whether the total occupancy area of the mail message is the same as or smaller than the area of the preview field.

(3) In the above embodiment, the judgment unit judges simply whether the characters with the current size fit in the preview field; however, the judgment unit may make the judgment when the control unit 160 changes the character size. This judgment can be performed when alterable character sizes have been specified and the size per character has been stored for each of the alterable character sizes. Here, whether the area occupied by the entire mail message after the change of the character size is the same as or smaller than the area of the preview field is judged.

In addition, in the case where the entire mail message fits in the preview field if the current size of the message characters is altered to another size, i.e. a smaller size, the mail message may be displayed with the smaller character size. Here, it is necessary to also store a value representing a height occupancy rate in a font table, like one explained in the Additional Particular (2) above.

Figure 8:
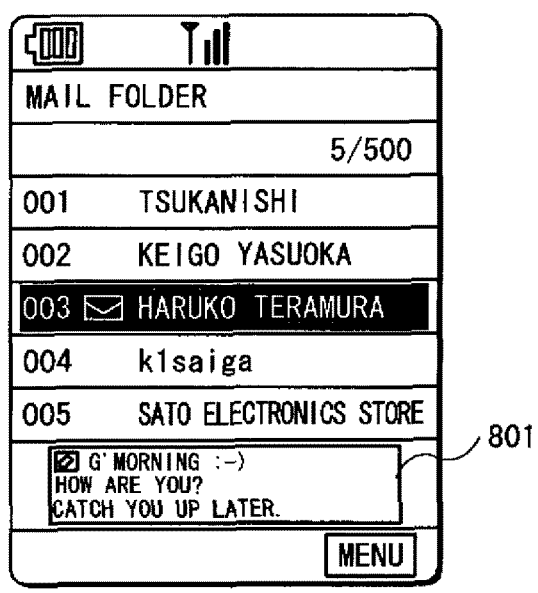
FIG. 8 shows a display example in which a mail message in the preview on the mobile telephone is displayed in a different character size.

FIG. 8 shows a display example in which a received mail item can be displayed by reducing the character size. In the case when the character size is 12, which is one character size shown in FIG. 7, the entire mail message is not displayed, as shown in FIG. 3B; however, the character size is altered to 8, and then the entire mail message can be displayed in a preview field 801 as shown in FIG. 8.

Since the entire mail message is displayed in the preview field 801, the update unit 162 updates the unread/read information of the mail number 003 in the received mail 151, if it indicates "UNREAD", to "READ".

(4) In the above embodiment, the control in consideration of linefeed codes is performed as shown in FIG. 6. This control based on linefeed codes may be altered as follows.

For example, when a linefeed code is included, the judgment unit 161 calculates the number of the displayed characters in the line where the linefeed code is positioned, adds the number of remaining character spaces (one space corresponds to one character) in the line to the calculated number, and judges whether the sum is 34 or less.

(5) In the process of unread/read information of the above embodiment, even if the unread/read information already indicates "READ", it may be updated to be "READ" when the entire mail message is displayed in the preview. Alternatively, if the unread/read information already indicates "READ" when the preview is made, the judgment on the display of the entire mail message may be omitted.

(6) In the above embodiment, the explanation is given using the mobile telephone as an example of the information communication terminal; however, the present invention is not limited to the mobile telephone, and any terminal having a function of receiving a mail item and display in the preview the mail item together with a list of received mail can be used. A PDA (Personal Digital Assistant), for example, can be used in place of the mobile telephone.

(7) In the above embodiment, the number of characters that can be displayed in the first line in the preview is 16, and in the second line, 18. However, these numbers of characters can be changed in accordance with the specification of the information communication terminal, and for example, the first and second lines may include 10 and 12 characters, respectively.

(8) In the above embodiment, the waiting time after the received mail item is displayed in the preview is set to 2 seconds, as shown in Step S601 of FIG. 6. However, the waiting time is not limited to 2 seconds, and may be 5 seconds, for example.

What is claimed is:

1. An information communication terminal that displays, together with a received mail list, at least part of a message of a received mail in a predetermined display area, comprising:
   a receiver configured to receive a mail;
   a memory configured to store therein the received mail in association with unread/read information indicating whether the received mail has already been read;
   a controller configured to make a judgment on whether all of the message of the received mail is displayed in the predetermined display area and to perform an update in a case when the judgment is affirmative so that the unread/read information indicates that the received mail has already been read,
   wherein the controller compares a count of characters included in the message of the received mail and a count of characters that can be displayed in the predetermined display area, and makes the judgment affirmatively in a case where the count of characters included in the message of the received mail is equal to or less than the count of characters that can be displayed in the predetermined display area, and
   the controller further detects, in a case where a linefeed code is included in the message of the received mail, the count of characters included in the message of the received mail by calculating a total number of displayed characters preceding a position in the line where the linefeed code is inserted, wherein the linefeed code comprises code for starting a new character line.

2. The information communication terminal of claim 1, further comprising:
   an operation receiver configured to receive a choice operation in which one received mail is chosen from the received mail list by cursor operation, and set the chosen received mail in a selected state; and
   the controller is further configured to perform, in the predetermined display area, display of as much of a message of the chosen received mail in the selected state as is possible, starting from the beginning of the message.

3. The information communication terminal of claim 2, wherein the controller performs the update in a case where a predetermined period of time has elapsed since a start of the display of the message of the chosen received mail in the selected state.

4. The information communication terminal of claim 2, wherein the controller is further configured to perform a display operation in which the message of the chosen received mail in the selected state is displayed without the received mail list and to perform full-message display in which all of the message of the chosen received mail in the selected state is displayed, wherein the controller performs the update in a case where the full-message display unit performs the full-message display.

5. The information communication terminal of claim 4, wherein the controller performs the update only when the unread/read information indicates that the chosen received mail in the selected state has not been read.

6. The information communication terminal of claim 1, wherein the controller is further configured to display on a standby screen, in a case where the unread/read information indicates that the received mail has not been read, an icon indicating that there is an unread received mail.

7. A method of marking a mail as read used on a mobile telephone that displays in a predetermined display area, together with a received mail list, at least part of a message of a received mail chosen from the received mail list by cursor operation and set in a selected state, the method comprising the steps of:
 (a) receiving a mail;
 (b) making a judgment on whether all of the message of the received mail is displayed in the predetermined display area; and
 (c) updating, in a case where the judgment is affirmative, unread/read information indicating whether the received mail has already been read so as to indicate that the received mail has already been read,
wherein the step (b) comprises comparing a count of characters included in the message of the received mail and a count of characters that can be displayed in the predetermined display area, and making the judgment affirmatively in a case where the count of characters included in the message of the received mail is equal to or less than the count of characters that can be displayed in the predetermined display area, and
the step (b) further comprises detecting, in a case where a linefeed code is included in the message of the received mail, the count of characters included in the message of the received mail by calculating a total number of displayed characters preceding a position in the line where the linefeed code is inserted, wherein the linefeed code comprises code for starting a new character line.

* * * * *